United States Patent [19]

Nakamura

[11] Patent Number: 4,483,191

[45] Date of Patent: Nov. 20, 1984

[54] AIRSPEED INDICATOR FOR LOW-SPEED CONVEYANCES

[75] Inventor: Shuji Nakamura, Komae, Japan

[73] Assignee: Tokyo Aircraft Instrument Co., Ltd., Komae, Japan

[21] Appl. No.: 434,414

[22] Filed: Oct. 14, 1982

[30] Foreign Application Priority Data

Aug. 6, 1982 [JP] Japan .......................... 57-119484[U]

[51] Int. Cl.³ ............................................. G01C 21/10
[52] U.S. Cl. ..................................................... 73/187
[58] Field of Search ...................... 73/187, 189, 861.85

[56] References Cited

U.S. PATENT DOCUMENTS

| | | | |
|---|---|---|---|
| 439,442 | 10/1890 | Thorne et al. | 73/187 |
| 2,549,754 | 4/1951 | Bosch | 73/498 |
| 2,742,783 | 4/1956 | Jasse | 73/861.85 |
| 3,406,570 | 10/1968 | White | 73/861.85 |
| 4,136,562 | 1/1979 | Crooker | 73/187 |

Primary Examiner—Donald O. Woodiel
Attorney, Agent, or Firm—Spencer & Frank

[57] ABSTRACT

An airspeed indicator for low-speed conveyances which comprises a thin cylindrical hood, a generator supported at the center within the hood and a propeller mounted on the driving shaft of the generator. An indicating means for indicating the magnitude of the airspeed on a scale plate with a pointer is also provided, the pointer being rotated in proportion to the current through an ammeter coupled to the output of the generator. Means for supporting the hood is further provided, the means holding the hood so that when the indicating means is mounted on the low-speed conveyance, the hood may be fixed to face the flight direction.

11 Claims, 16 Drawing Figures

FIG.10(a)   FIG.10(b)
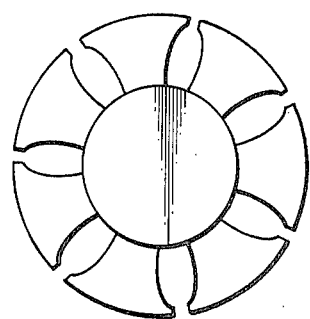
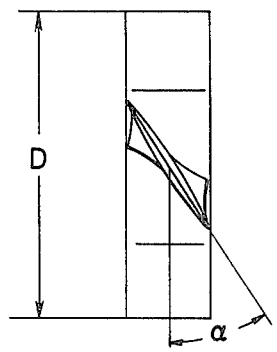
FIG.11
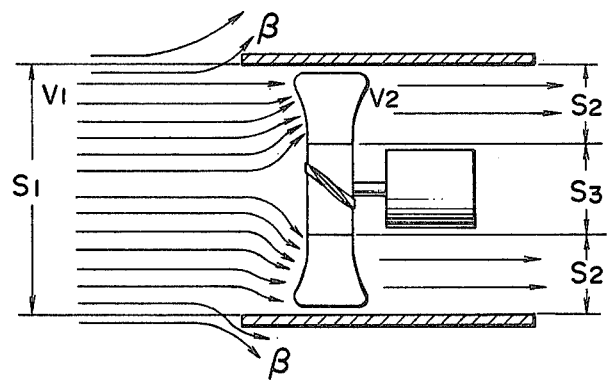

AIRSPEED INDICATOR FOR LOW-SPEED CONVEYANCES

BACKGROUND OF THE INVENTION

The present invention relates to an airspeed indicator for low-speed conveyances, and more particularly to an airspeed indicator for low-speed conveyances, such as hang gliders, motor hang gliders, gyrocopters, home-built airplanes, motorboats and hovercrafts, that is, other than vehicles which run on the ground.

The lowest speed at which hang gliders operate is about 25 kilometers per hour (Km/h). When the airspeed is lowered until it just exceeds the lowest limit speed, the glider loses its lift and begins to drop. In this state, it can no longer be controlled. In order to recover the glider from its stalling state, the driver lowers its nose and pushes out a control bar in the forward direction. However, recovery in this manner is not possible once the altitude of the glider becomes extremely low. For this reason, a meter such as a speedometer is essential for the driver of a hang glider.

The Pitot static pressure type speedometer has been used for measuring the airspeed of hang gliders and similar low-speed conveyances. In this method, the dynamic pressure received by a Pitot tube is fed to a diaphragm capsule included in the instruments and is indicated on an indicator which is associated with the displacement of the capsule.

The Pitot static pressure type speedometer is quite useful for relatively high-seed aircrafts, but not for low-speed conveyances such as hang gliders, whose speed is only below 200 Km/h (=125 miles/h). The reason is that at such a low speed, the pressure is very small (about 200 mm Hg or less) and therefore the instruments in which the diaphragm capsule receives the pressure do not work sufficiently and might indicate a large error. For these reasons, the Pitot speedometer is not suitable for measuring stalling speed of approximately 25 Km/h.

SUMMARY OF THE INVENTION

The airspeed indicator for low-speed conveyances according to the present invention comprises a thin cylindrical hood; a generator supported at the center within the hood; a propeller mounted on the driving shaft of the generator; an indicating means for indicating the airspeed on a scale plate with a pointer, the pointer rotating in proportion to a current indicated by an ammeter which detects the output from the generator; and means for holding the hood which holds the hood so that when the indicating means is mounted on the low-speed conveyances, the hood may be fixed so as to face the flight direction.

BRIEF DESCRIPTION OF THE DRAWINGS

FIGS. 9, 10(a), 10(b) and 11 show the characteristics of the airspeed indicator according to this invention.

DESCRIPTION OF THE PREFERRED EMBODIMENT

Figure 1:
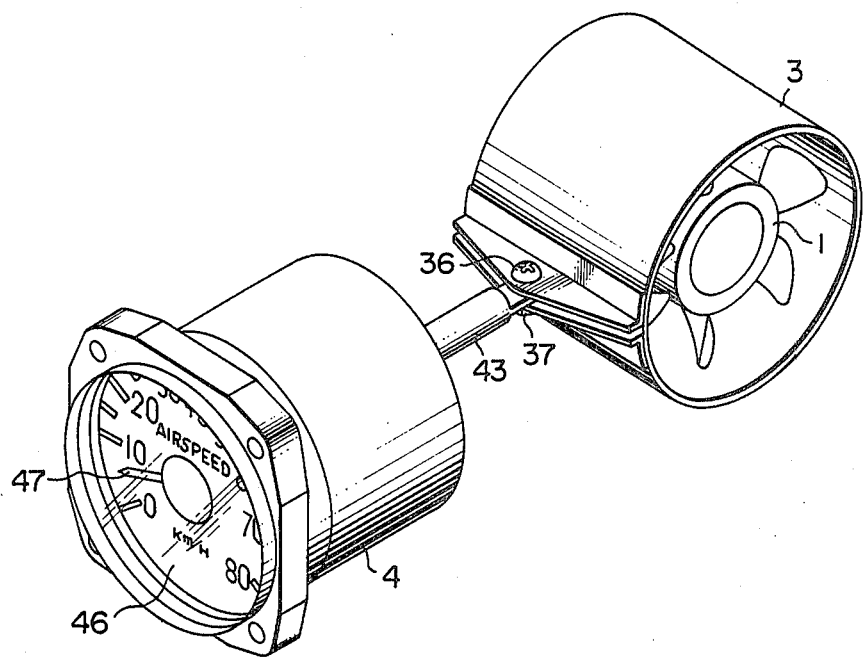
FIG. 1 is a perspective view of an embodiment of an airspeed indicator according to this invention.

As shown in FIG. 1, the embodiment of the airspeed indicator according to this invention comprises a receiving, detecting part and an indicating part and a connecting part. In the receiving and detecting part of the airspeed indicator, a propeller 1 mounted in a hood 3 receives an air current and is rotated thereby. Rotation of the propeller 1 causes a generator 2 (FIG. 2) contained within the hood 3 to rotate and generate electric power, voltage being generated across output leads 25a and 26a. In the indicating part, the current generated by the generator is indicated by an ammeter 5 (FIG. 3) to swing a pointer 47 so that it points to an airspeed on the scale plate 46 of an indicator means 4. The receiving and detecting part and the indicating part are connected by the connecting part which includes a holding member 43. The relative angle between the parts can be chosen as desired using a bolt 36 and a nut 37.

Figure 2:
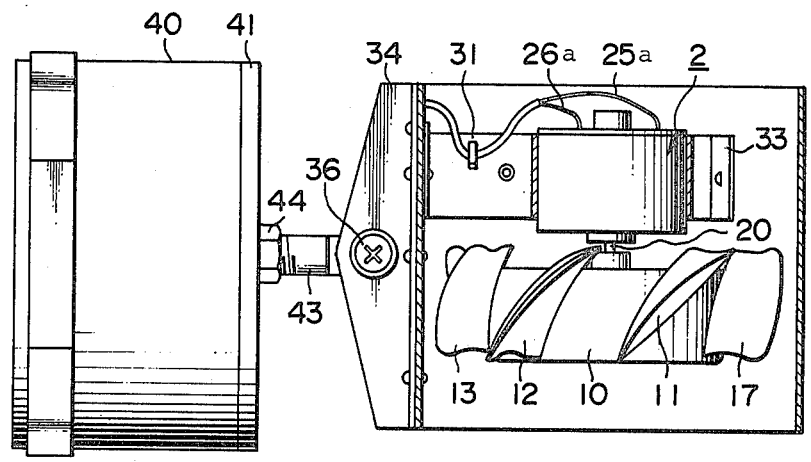
FIG. 2 is a plan view of the embodiment of the airspeed indicator according to this invention, which is partly broken away for easy understanding of the structure.
Figure 3:
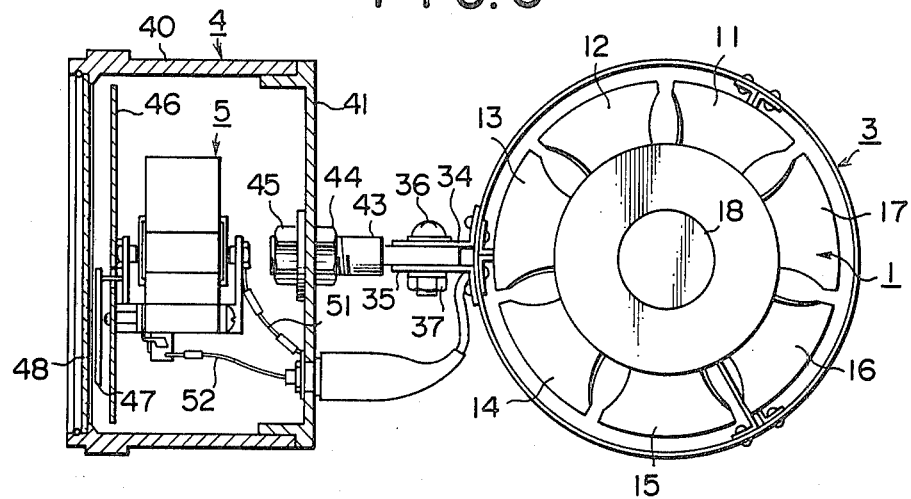
FIG. 3 is a front view of the embodiment of the airspeed indicator, in which a part thereof is shown in section.

The propeller 1 comprises, as clearly shown in FIGS. 2 and 3, a wheel 10 and seven propeller blades 11, 12, 13, 14, 15, 16 and 17, the wheel 10 and the propeller blades being made of integrally molded plastic. To the wheel 10 a metal hub 18 is inserted. To the drive shaft 20 of the generator 2 the hub 18 of the propeller 1 is also inserted.

Figure 4:
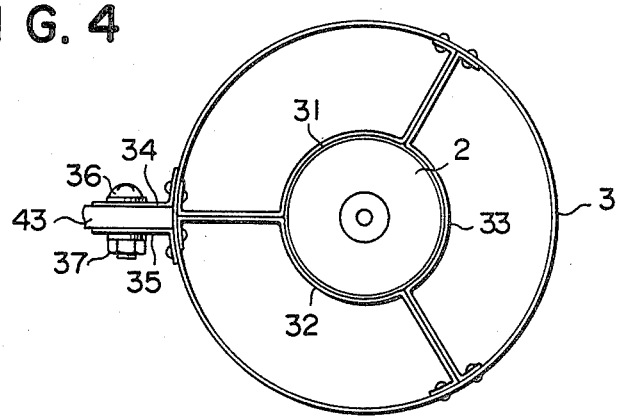
FIG. 4 is a front view of a hood of the airspeed indicator from which a propeller is taken away.

The hood 3 is made of a thin aluminium cylinder and on the inner surface thereof three supporting plates 31, 32 and 33 are fixed with rivets, the three supporting plates 31, 32 and 33 holding the generator 2 as fully shown in FIG. 4.

On the outer wall of the hood 3 are rivetted connecting plates 34 and 35, respectively. To the case 40 of the indicator means 4, there is provided a back plate 41, and to the back plate 41 a holding member 43 is fixed with nuts 44 and 45. The indicator means 4 may thus be fixed at a desired angular position. The leading end of the holding member 43 is fixed with the connecting plates 34 and 335 with a bolt 36 and a nut 37. Thus any desired angular position of the indicator means 4 may be selected.

A scale plate 46, is calibrated to show airspeed, is provided on the indicator means 4, and on the scale plate 46 a pointer 47 rotates or swings in proportion to a current indicated by the ammeter 5. A transparent plate 48 covers the front of the scale plate 46 for protection thereof.

Figure 6A:
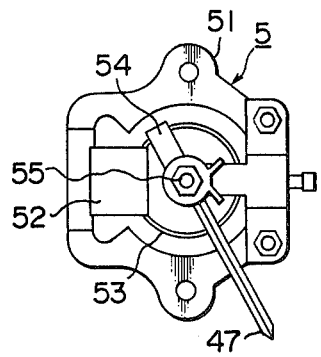
FIGS. 6(a) and 6(b) are a side view and a front view of an ammeter used in the airspeed indicator according to this invention, respectively.
Figure 6B:
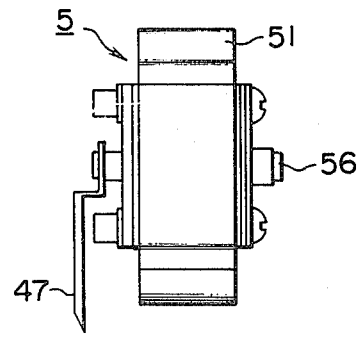

As shown in FIGS. 6(a) and 6(b), a magnetic field is generated in the ammeter 5 of the airspeed indicator by an outer yoke 51, a permanent magnet 52 provided in contact with the outer yoke 51 and an inner yoke 53 in the form of a circular ring which is in contact with one end of the permanent magnet 52. A coil 54 is rotatably supported with pivots 55 and 56 and the coil 54 may be rotated while loosely supporting the inner yoke 53 between the pivots. The pointer 47 is integrally mounted on a rotating shaft of the coil 54. When coil 54 is energized, the pointer 47 rotates around the pivots 55 and 56 through an angle proportional to the current and points to markings on the scale plate 46.

Figure 7A:
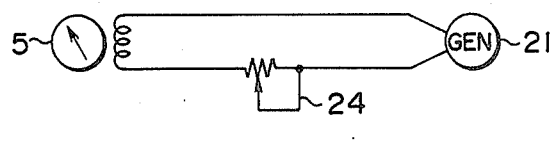
FIGS. 7(a), 7(b) and 7(c) are circuit diagrams showing circuits of the airspeed indicator of this invention.
Figure 7B:
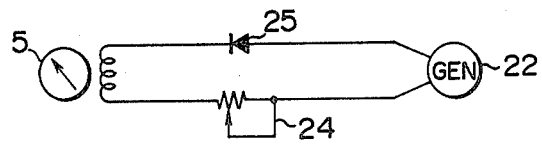
Figure 7C:
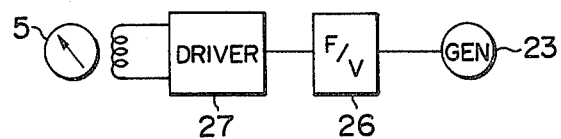

FIGS. 7(a), 7(b) and 7(c) are circuit diagrams of three different embodiments of the airspeed indicator according to this invention. In FIG. 7(a) the rotation of the propeller 1 is transmitted to a DC generator 21 which can be rotated with small power. The current component generated indicates the airspeed by the swing of the ammeter 5. A variable resistor 24 shown in FIG. 7(a) is for adjusting the sensitivity of the ammeter 5 when it detects the current generated by the generator 21. When an AC generator 22 is used, the current through ammeter 5 is rectified by a rectifier 25 (FIG. 7(b)). When a pulse generator is used as shown in FIG. 7(c), a pulse detector 23 detects the rotation of the propeller 1. The number of revolutions of the propeller 1 which is detected in the form of frequency is converted through a frequency/voltage converter 26 into a voltage proportional to the number of rotations, which is further processed by operating the ammeter with a driver 27 to indicate the speed. In this case, the detected value of the ammeter 5 may be indicated by a digital display in place of the swing of a pointer. By utilizing the voltage of the generator 2, a warning by a buzzer may be generated in order to alert the pilot of the airplane when the speed is below the stalling limit or over the maximum point.

Figure 8A:
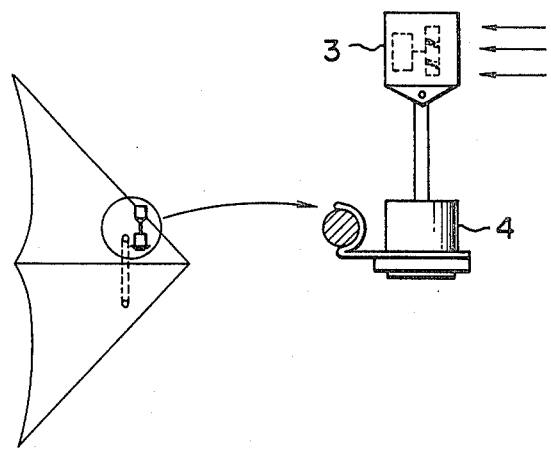
FIGS. 8(a) and 8(b) are explanatory views of the airspeed indicator in actual use in a hang glider and a motor hang glider, respectively.

Now an explanation will be made on the actual use of the airspeed indicator according to the present invention. FIG. 8(a) shows the actual use on a hang glider. In the operation of a hang glider, the pilot drives the glider by gripping the base of a triangular control lever, and a meter and other instruments are mounted on the slanting faces of the triangle. For the convenience of the pilot, the face of the scale plate 46 in the indicator means 4 should be mounted almost perpendicularly with respect to the direction of flight. However, the hood 3 must be parallel to the direction of flight. For solving the problem, the hood 3 is first fixed in the direction of flight and the position of the indicator means 4 then adjusted to the desired position by the nuts 44, 45 and-/or the bolt 36 and nut 37.

Figure 8B:
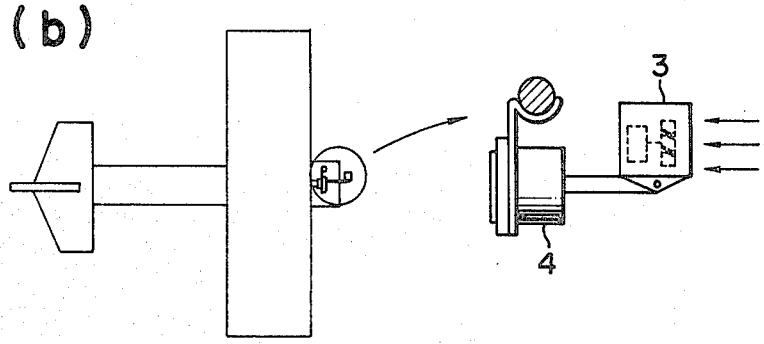

If there is a space for mounting the indicator means in the front of the pilot as shown in FIG. 8(b) which shows an example of a motor hang glider, both the scale plate 46 and the hood 3 may be set parallel to the direction of flight.

The inventor of this invention has made sufficient measurement on the airspeed and the output voltage of the generator, that is, the number of revolutions of the propeller 1, according to the airspeed indicator of this invention and carefully studied the characteristic of the airspeed indicator. FIGS. 9, 10(a), 10(b) and 11 are for explaining the characteristic of the airspeed indicator according to the present invention.

Figure 5:
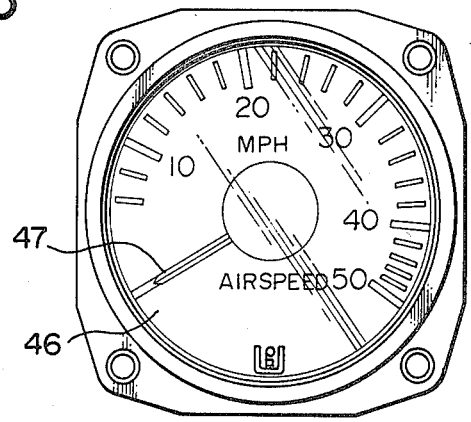
FIG. 5 is a front view of the indicating means of the airspeed indicator according to this invention, seen from the side of the scale plate.
Figure 9:
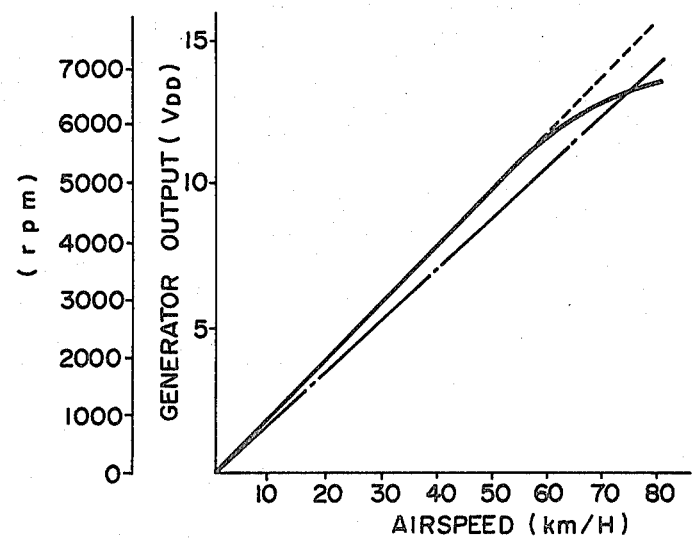

FIG. 9 is a graph showing the relation between the airspeed and the output voltage of the generator (corresponding to the number of revolutions of the propeller). As shown by the full line in FIG. 9, the output of the generator 2 almost reaches its saturation at a speed in excess of approximately 50 Km/h. This occurs because at this condition, the propeller blades 11–17 begin to slip against the airspeed and the efficiency of the blades begins to drop at the range where the number of revolutions of the blades exceeds 5,000 rpm. At a flight speed of 80 Km/h, the efficiency of the blades becomes 83%. The scales of the scale plate 46 for more than 55 Km/h (in case of the example of FIG. 5, more than 40 miles/h) are therefore made narrower gradually. An ordinary velocity of a hang glider is between 30–50 Km/h and so the above crowded or compressed scale does not make any obstacle for ordinary use, but rather is convenient because for the ordinary flight speed range wider scales can be used. If the maximum scale of 100 Km/h may better be used for the scale plate 46, the pitch angle of the propeller blades 11 through 17 may be made larger so that at the speed corresponding to full scale the number of revolutions of the propeller blades 11 through 17 is 6,500 rpm. It should be noted however that as the pitch angle for the propeller blades is made larger, the starting condition at low speed becomes worse.

FIG. 10(a) is a front view of a propeller and FIG. 10(b) is the side view thereof. The lead of the propeller is given as L meters; the lead angle as $\alpha$ degrees and the diameter as D meters. According to the propeller 1 of this invention, $\alpha = 38$ degrees, $D = 0.075$ meter, and so:

$$L = \tan \alpha \cdot D\pi = 0.781 \times 0.075\pi = 0.184 \text{ meter.}$$

The number of non-slip revolutions at full speed is:

$$(80/60) \div (0.184/1000) = 7246 \text{ rpm.}$$

According to the ideal characteristic which is given in FIG. 9 as a dotted line, the number of non-slip revolutions at a full scale speed is 8,000 rpm, from which $$8000/7246 = 1.10.$$

In short, the number of revolutions is larger by 10% than the lead angle calculation value. This will be further explained with reference to FIG. 11.

The flow of air entered from the front side of the hood is interrupted by an interrupting area $S_3$ and escapes into the pass area $S_2$. According to the formula, $vS = $ constant at a steady flow, the accelerated propeller rotates in proportion to the speed, and $$v_1 S_1 = v_2 S_2$$

$$80 \times 50.24 = v_2 \times 31.4$$

therefore, $v_2 = 128$ Km/h.

The obtained value, 128 Km/h, is, compared with 80 Km/h, $128/80 = 1.6$, is 1.6 times.

By the back pressure at the inlet of the hood, air escapes outwardly as shown by $\beta$. The speed ratio substantially becomes 1.10. Thus it is confirmed that the actual airspeed is the same as the measured value.

As above explained in detail, the airspeed of relatively low-speed conveyances, such as hang gliders can be measured precisely according to this invention.

The position for mounting the indicator means and the hood may be selected as desired, and therefore when the indicator means is mounted for easy viewing, the hood may also be mounted in a desired position.

The invention has been described in detail with particular reference to a preferred embodiment thereof, but it will be understood that variations and modifications can be effected within the spirit and scope of the invention.

What is claimed is:

1. An airspeed indicator for low-speed conveyances, comprising:
   a receiving and detecting part including
   a hollow cylindrical hood having a first longitudinal axis aligned in the direction of movement of said conveyance;
   a generator having a drive shaft and output means, said generator being mounted within said hood with its drive shaft extending along said first longitudinal axis; and
   a propeller mounted on the drive shaft of said generator, said propeller rotating about said first longitudinal axis;
   an indicating part including
   a hollow case having a second longitudinal axis;
   a scale plate located at one end of said hollow case positioned transverse to said second longitudinal axis, said scale plate being calibrated to indicate airspeed in distance per unit time; and
   an ammeter positioned within said hollow case and coupled across the output means of said generator, said ammeter having a pointer adjacent said scale plate for rotation through an angle corresponding to the current through said ammeter and indicating on said scale plate the airspeed of said conveyance; and
   a connecting part including
   a holding member having one end thereof adjustably secured to said hollow case; and
   means adjustably securing the other end of said holding member to said hollow cylindrical hood, the direction of said second longitudinal axis being adjustable with respect to the direction of said first longitudinal axis to permit said scale plate to be conveniently viewed by the operator of said conveyance when said first longitudinal axis is aligned in the direction of movement of said conveyance.

2. An airspeed indicator for low-speed conveyances according to claim 1, wherein the low-speed conveyances are hang gliders.

3. An airspeed indicator for low-speed conveyances according to claim 1, wherein said generator is secured to said hood with three fixing members.

4. An airspeed indicator for low-speed conveyances according to claim 1, wherein said generator is a DC generator.

5. An airspeed indicator for low-speed conveyances according to claim 1, wherein said propeller has seven propeller blades.

6. An airspeed indicator for low-speed conveyances according to claim 5, wherein the lead angle of the propeller blades is 38 degrees.

7. An airspeed indicator for low-speed conveyances according to claim 1, wherein the calibrations on said scale plate indicate airspeeds between 0 Km/h and 80 Km/h, and for airspeeds higher than 55 Km/h said calibrations are compressed.

8. An airspeed indicator for low-speed conveyances according to claim 1, wherein the second longitudinal axis of said hollow case is substantially perpendicular to the first longitudinal axis of said hollow hood.

9. An airspeed indicator for low-speed conveyances according to claim 1, wherein said holding member is coaxially aligned with said second longitudinal axis, and wherein said hollow case is rotatable about said second longitudinal axis.

10. An airspeed indicator for low-speed conveyances according to claim 1, wherein said means adjustably securing the other end of said holding member to said hollow cylindrical hood is an elongated member extending in a direction perpendicular to said first and second longitudinal axes, said holding member being rotatable about said elongated member.

11. An airspeed indicator for low-speed conveyances according to claim 9, wherein said means adjustably securing the other end of said holding member to said hollow cylindrical hood is an elongated member extending in a direction perpendicular to said first and second longitudinal axes, said holding member being rotatable about said elongated member.

* * * * *